Figure 6:
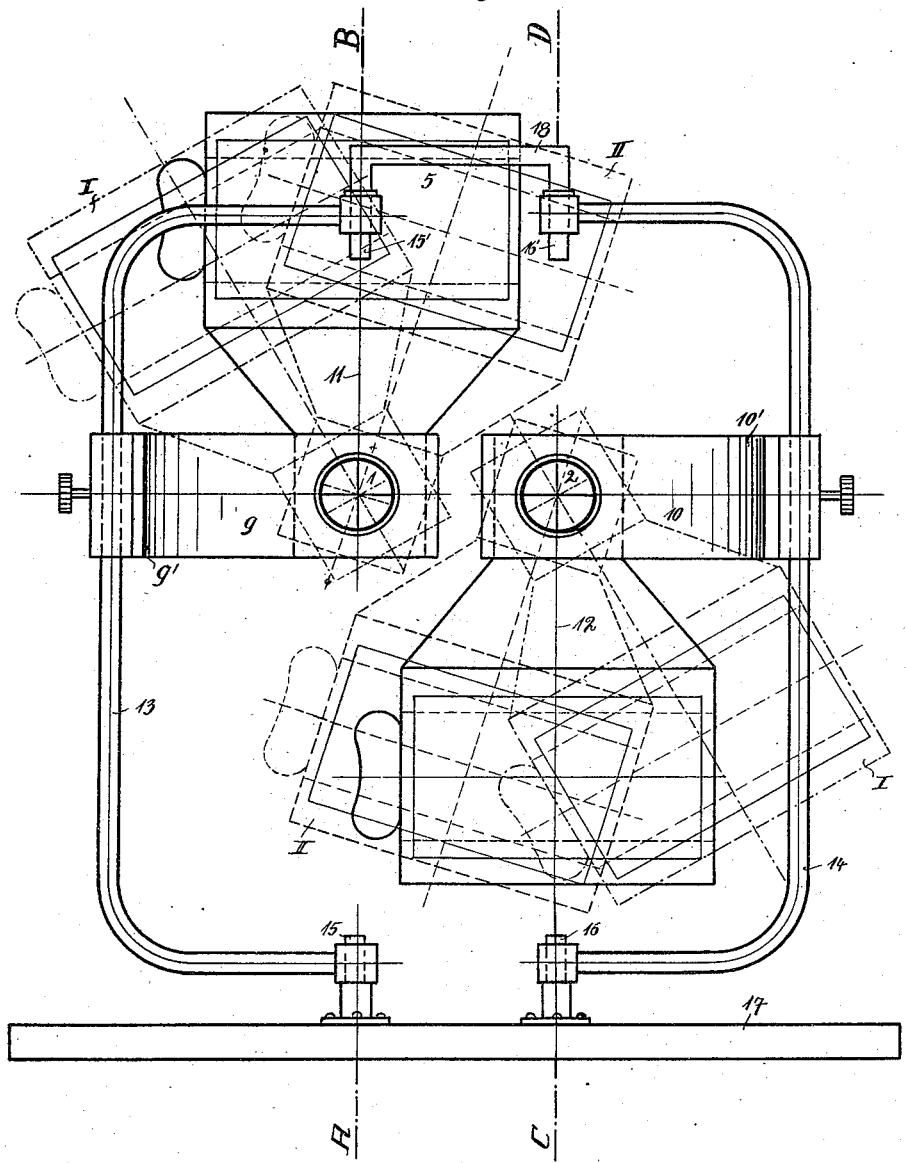

May 20, 1924.
K. BEYERLEN
STEREOSCOPE
Filed Aug. 2, 1920
1,494,728
4 Sheets-Sheet 1
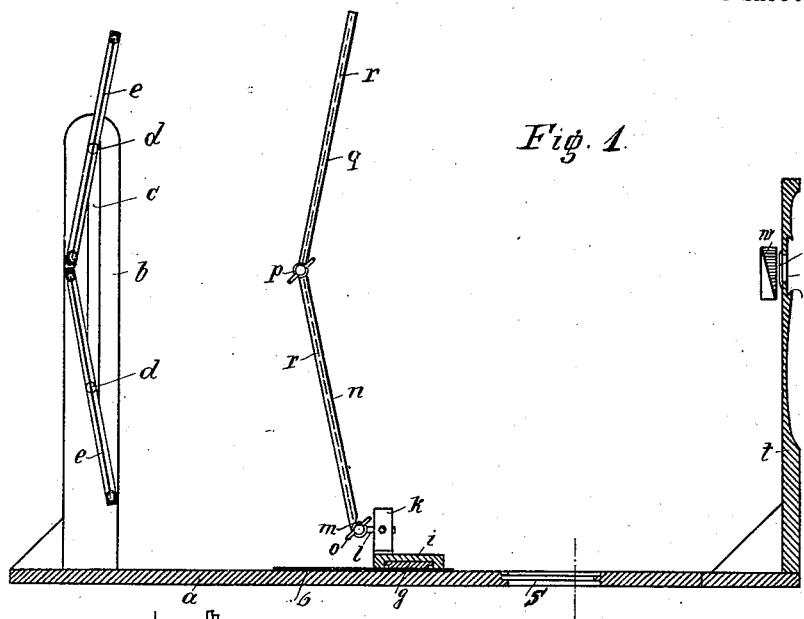
Fig. 1.
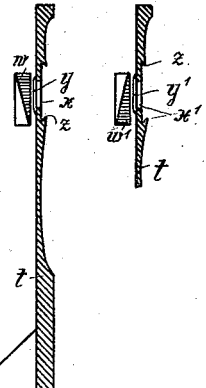
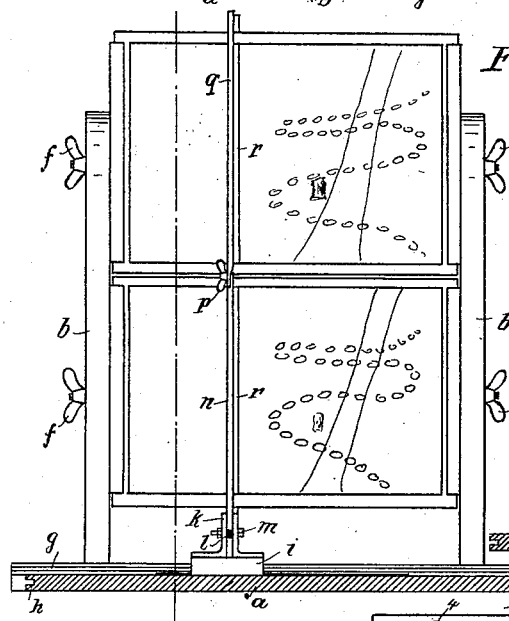
Fig. 2.
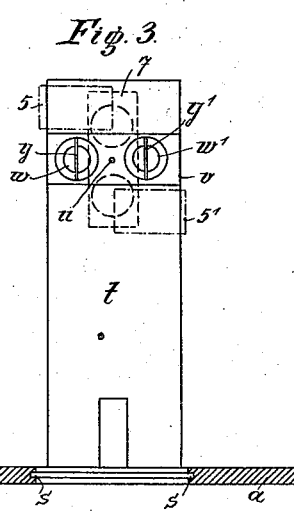
Fig. 3.
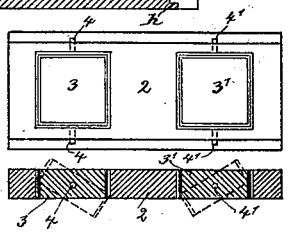
Fig. 4.
Fig. 5.
INVENTOR
KURT BEYERLEN
By
HIS ATTORNEY May 20, 1924.

K. BEYERLEN

STEREOSCOPE

Filed Aug. 2, 1920

1,494,728

4 Sheets—Sheet 2

INVENTOR
KURT BEYERLEN
HIS ATTORNEY

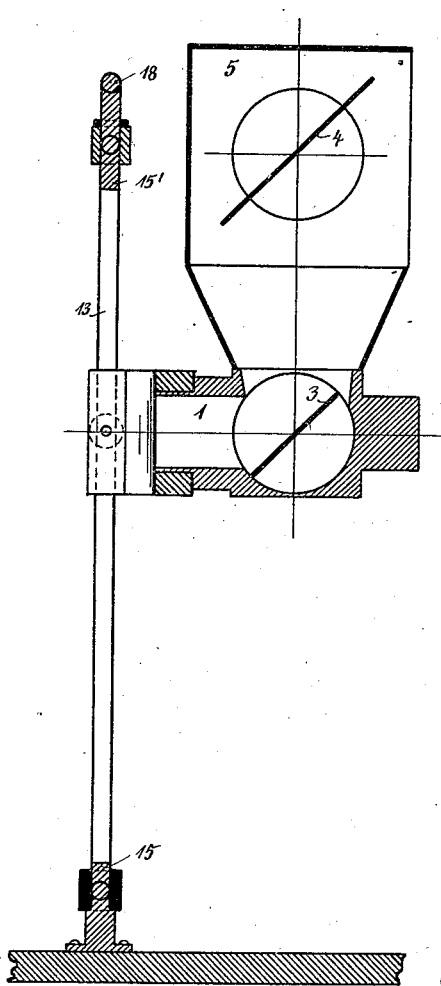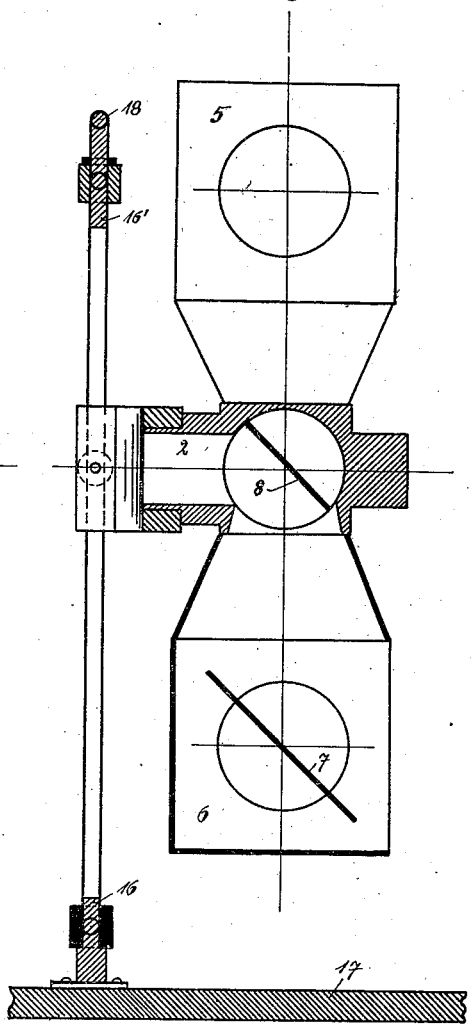

May 20, 1924.
K. BEYERLEN
STEREOSCOPE
Filed Aug. 2, 1920
1,494,728
4 Sheets-Sheet 4
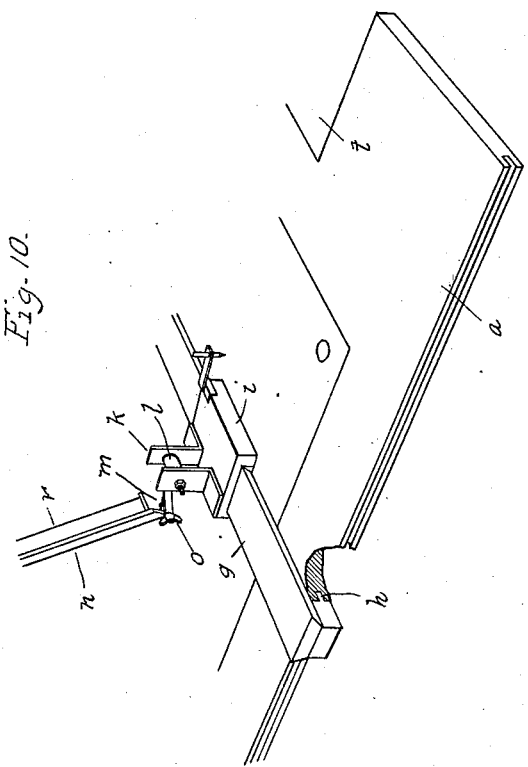
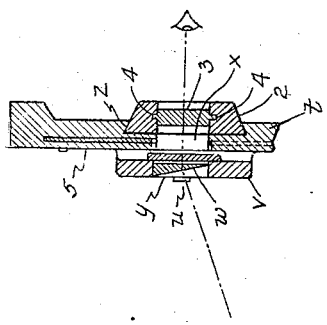
Kurt Beyerlen
INVENTOR
his ATTORNEY Patented May 20, 1924.

1,494,728

UNITED STATES PATENT OFFICE.

KURT BEYERLEN, OF MUNICH, BAVARIA, GERMANY.

STEREOSCOPE.

Application filed August 2, 1920. Serial No. 400,834.

(GRANTED UNDER THE PROVISIONS OF THE ACT OF MARCH 3, 1921, 41 STAT. L., 1313.)

*To all whom it may concern:*

Be it known that I, KURT BEYERLEN, citizen of Germany, residing at Munich, Bavaria, Germany, have invented certain new and useful Improvements in Stereoscopes; and I do hereby declare the following to be a full, clear, and exact description of the invention, such as will enable others skilled in the art to which it appertains to make and use the same.

My invention relates to improvements in stereoscopes and the object of my invention is to provide for an optical instrument, as mentioned, which not only brings to plastic view any suitable picture, as heretofore, but permits also of a convenient graphical or plastical reconstruction and measurement of stereoscopic Roentgen-pictures, photogrammetric reproductions, landscapes and other representations.

In describing my invention I refer to the drawings herewith in which Figure 1 is a longitudinal section through a construction as herein described; Figure 2 is a transverse section through and partial elevation of my device comprising the two pictures of an object, as well as certain parts for the reconstruction and measuring herein referred to.

Figure 3 is a transverse section through the said construction on the line indicated in Figure 2 and showing the rear side of the ocular herein mentioned, while Figures 4 and 5 are, respectively, an elevation and a horizontal section through the device, also hereinafter described, for the adjustment or correction of interocular distance. Figure 6 is an elevation of a mirror-system showing the relatively adjustable positions of the right and left hand mirrors in dotted lines, as hereinafter referred to. Figure 7 is a section on the line A—B of Figure 6 and Figure 8 a section on the line C—D of the same Figure. Figure 9 is a sectional view of lens supporting apparatus; and Figure 10 is a perspective view of the marking device and its supporting members.

The main feature of my invention resides in the fact that an indicator is provided movable in the space between the ocular and the pictures, or in case of transparencies behind the same, for each of the pictures of an object, both of the said indicators being guidedly connected with each other and with a drawing- or dotting-pen or pencil and preferably attached to lines of wire or string which are placed parallel to the planes of the pictures of the respective object in a plane which is in normal position to the plane of the said pictures.

By placing the two pictures above each other, as already known, prisms or prismatic lenses may be employed in the ocular, the refracting edge of the same being on one side directed upward and on the other downward. This saves the employment of mirrors and thus essentially simplifies the construction and reduces the cost of the apparatus.

The planes of the two pictures which may be either adjoining to or be separated from each other, I prefer to dispose so as to be adjustable with relation to each other at an obtuse angle and thereby secure as an advantage that the solid or relief impression of the object which one gets in looking at the pictures through the prisms, becomes more natural and distinct, because in this case the two picture planes coincide effectively in the stereoscopic picture without as heretofore intersecting at an angle, however small the same may be. In other words, the angles of visual projection from the prisms toward the pictures will be substantially at right angles to the planes of the pictures themselves, such projections, producing upon the eyes the exact impressions originally picked up by the lenses of the stereoscopic camera in which the pictures were made. Another advantage of the new arrangement will be found in the possibility of an extremely simple reconstruction and measurement of the representation and its parts.

Still another advantage may be obtained by providing for an arrangement which permits of a mathematically exact verification of the result of such reconstruction and measuring after it has been done. This arrangement consists in mounting the ocular rotatably on a support with show-orifices and providing the same with a wire or string each, running diametrically to the said orifices and parallel to the plane of the angle made up by the two legs or arms of the reconstructive wire or string aforementioned.

On a base-plate $a$ there are mounted two stands $b$ provided with slots $c$ in which the axes $d$ of the two pictures $e$ of an object are placed vertically above and parallel to each other and guided. The extreme ends of the axes are threaded, engaging winged nuts $f$ to permit of a fixing, after adjustment, of the said two pictures. There is further provided in the said base-plate $a$ a transverse rail or bar $g$ sliding in lateral guidings $h$ in the direction of the axis of the instrument, and on the said rail $g$ there moves a laterally movable guide-bar $i$ provided with bearings $k$ in which there is a rotatable and adjustable bolt $l$ by means of which the rod $n$ may be turned and by a fly-nut $o$ firmly adjusted and secured. This rod $n$ carries jointedly connected therewith and adjustable by means of a fly-nut $p$ the rod or bar $q$. Stretched between opposite ends of the rods $n$ and $q$ and held substantially parallel to and spaced slightly away from one side of the latter is an indicator comprising a wire or string $r$.

In guide-grooves $s$ in the base-plate $a$ there is further slidingly mounted an ocular provided on a stand $t$ and slidable in the direction of the axis of the stereoscope. This ocular consists of a frame $v$ rotatable at $u$ on the stand $t$ and has two lenses or prisms, $w$, $w'$. The arrangement of the latter within the rotatable frame $v$ is thus that the refracting edge of one of the prisms or lenses, $w$, is directed downward and that of the other prism or lens, $w'$ pointing upward. With the said two lenses or prisms correspond the show-orifices $x$, $x'$ in the stand $t$. These openings are diametrically transversed by wires or strings $y$, $y'$, which are disposed parallel to the plane formed by the aforementioned wires or strings secured to the bars $n$ and $q$.

In guide passages $z$ of the stand $t$ a slab 2 may be inserted (see Figures 4 and 5) in which, corresponding to the aforementioned show-orifices $x$, $x'$ parallel plates 3, 3' are provided, so mounted and set as to be turnable about vertical axes 4, 4' in the slab 2. The two plano-parallel plates 3, 3' are by some suitable means, not shown on the drawing, so connected with each other that they permit of being guidedly twisted in their symmetric relative position to each other about the axes 4, 4', their respective adjustment being accomplished by the aid of a graduated scale.

In Figure 3 there are by dotted lines further indicated shutters 5, 5' on stands which may be placed behind the ocular, if one or the other of the lenses is to be shut off. These slides may be adjusted in a vertical plane to overlie their respective lenses.

In reconstructing the space and measuring same in a stereoscopic Roentgen-photograph I proceed as follows:

I first adjust the two pictures $e$ of a photograph (on glass) within the guide-slots $c$, giving them the proper angle and fixing the same by means of the fly-nut $f$. Then I give the two rods $n$, $q$ with wires or strings $r$ a position parallel to the planes of the said pictures $e$ by loosening their joints and correspondingly and properly turning or twisting the rods and subsequent tightening the fly-nuts $o$, $p$. Then, by operating the mechanism provided for the purpose and with the aid of the graduation scale referred to I adjust the two plano-parallel plates 3, 3' about their vertical axes, an operation which will bring the focus point into proper relation with the visual angle of the beholder, though in case the same is normal (65 millimeters) this is not necessary. When looking at the pictures through the ocular towards a source of light provided behind, the looker-on beholds the stereoscopic picture and traces by means of a suitable pen or pencil, provided for the purpose and hereinabove referred to, the outlines of the stereoscopic picture and its several constituent parts, making use of the string $r$ after corresponding adjustment of the bars $g$ and $i$ and holding the said pen or pencil against the guide-bar $i$, though this pencil may already under the action of a spring have been made to point downward, he may copy and fix the picture in the well known way on a suitable drawing-surface, which may, preferably, be securely attached to the base-plate $a$ by means of thumbtacks or the like. The tracing pencil may, of course, be replaced by a dotter or dotting-pen, whenever a picture or form corresponding to the stereoscopic picture is to be produced.

This graphic or plastic reconstruction or measurement, as described, affords the looker-on an opportunity of a mathematically exact verification and thus a guarantee of the proper measurement. For this purpose he turns the frame $v$ about a pivot $u$, giving it the position 7 indicated by dotted lines in Figure 3 and then takes out the slab 2 with the two plano-parallel plates. Thereupon, after adjusting the holder of the wire or string $r$ to a certain determined point on the picture, he aims at or gauges that point on one of the pictures by means of the string or wire $y$ of one of the show orifices $x$ and then, by employing the string or wire $y'$ of the other show-orifice $x'$ the same point on the other picture. If in both cases and without changing the position of the string or wire $r$ the same is in alinement with the points gauged and the strings or wires $y$, $y'$, this is a proof that reconstruction and measurement are correct.

When a reflector or mirror system is used, as herein before mentioned, the latter will not only correct any chromatic aberration of the lenses or prisms, but it will insure parallel emanation of the sight rays from the eyes, so as to enable the measuring string $r$ to be provided with a gauge point, i. e. a bead or the like, one of which is provided for each half picture, and which may not be used in connection with the construction previously described, because in this case the axial rays of the eye intersect each other. The gauge-points referred to, whose distance from each other remains the same with every gauge or meaurement, cover each other, when being looked at and by this way a horizontally movable stereoscopic point is obtained, which aids not only in the measurement, but also in graphic or plastic reconstruction, particularly of stereoscopic Roentgen photographs.

An ocular provided with a reflector-device, as referred to, is shown in elevation in Figure 6, in section on the line A—B in Figure 7 and in section on the line C—D in Figure 8.

In these figures 1 and $2^a$ are the two orifices of the ocular. In the left-hand show-orifice 1 there is inserted a mirror $3^a$ at an angle of 45 degrees to the axial ray emanating from the left eye. Opposite to the face of this mirror there is provided the face of another mirror $4^a$, parallel to the former, mounted in a casing 5, open in front. As in Figures 6 and 7 shown, it is placed above the show-orifice 1 of the ocular. An analogous casing 6 is provided beneath the show-orifice $2^a$ of the ocular, containing the mirror 7, the face of which is parallel to the face of the mirror 8 inserted in the show-opening $2^a$ and again at an angle of 45 degrees to the axial ray emanating from the right-hand eye (see Figure 8). The mirrors are provided with intersecting lines of string or thread.

This last described construction permits further the placing of the two pictures of an object in one plane, when the former are at a distance from each other, or closely adjacent each other, an arrangement which essentially facilitates operations.

As Figure 6 shows, the two sets or couples of mirrors $3^a$, $4^a$ and, respectively, 7, 8, are turnable each about the ray issued forth from each eye and may be turned, either severally and independent of each other, or they may be coupled together and turned in common with each other. The purpose of this adjustment is to select the pupilary distance corresponding to the displacement of the Roentgen (X-ray) tube during taking. This will do away with the necessity of keeping within normal ocular distance, i. e. 65 millimeters, and as a result the angles, at which the visual rays emanate, will cross each other at much more obtuse angles, thereby increasing the efficiency necessary to bring about exact measuring and at the same time to increase the stereoscopic effect.

When the point of observation is to be changed with respect to the photographed point, i. e. the position of the pictures, it is necessary to adjust the mirrors about their axes, such an adjustment causing the stereoscopic view to be either condensed or elongated as the case may be.

In the former case, in looking at wounded parts of the human body the successive variation of the depths in the skin, splinters and scales of bone may be easier distinguished and examined which may be of great advantage to the surgeon. With this end in view I give to each of the two sets of mirrors the position I, indicated in Figure 6 by dotted lines. When, however, the points of observation are to be changed with respect to the point at which the photograph has been taken the view to be attained is more concentrated rather, I give to the sets of mirrors the position II, also indicated by dotted lines in the said Figure 6 with the result that a better stereoscopic effect will be attained for the beholder of the image.

On seperating the points of observation the axial rays of the eyes will have to converge to a greater degree. To avoid this the two sets of mirrors $3^a$, $4^a$ and, respectively 7, 8, may be turned more horizontally relative to each other. This may be done by dividing the ocular into two parts 9, 10, each to be independent of the other and each of the said parts to be rotatable about a vertical imaginary axis 11 or, 12, respectively both of the said axes to pass the points of ocular crossing. For this purpose I provide the portions 9 and 10 of the ocular with a bend 9', 10' each and adjustably secure them to the curved frames 13, 14, rotatable about the bolts 15, 15' and, 16, 16' respectively, the said bolts 15 and 16 being secured in the table 17 while the bolts 15' and 16' are part of an arched connecting frame 18. The axes of the bolts 15, 15' and 16, 16' coincide with the axes 11, 12 aforementioned.

Owing to the symmetrical distortion of of the two couples of mirrors the stereoscopic view resulting therefrom is not formed by two parrallel picture planes, but by the two picture planes interescting each other. This is a generally known old fault in stereoscopes which is, however, not detrimental to the measurement or reconstruction with the aid of the hereinabove mentioned measuring beads in the strings, because these beads are in a plane substantially parallel to that of the pictures and thus participate in and by this way practically compensate for the fault mentioned.

I would add that each set or couple of mirrors may be turned round by about 180 degrees, 80, that the casing 5 moves downward and the casing 6 upward. In this position the beholder will see the pseudo-stereoscopic picture without the requirement of exchanging the pictures or the mirrors with each other, this pseudo-stereoscopic picture falling behind the plane of the two pictures of the object photographed.

I claim:

1. In a stereoscope of the character described, the combination with two pictures adjustable in different planes and arranged one above the other, of a stereoscopically arranged pair of lenses having parallel indicating lines diametrically disposed across the lenses, and an adjustable indicator wire held parallel to the plane of said pictures and between the latter and the said lenses.

2. A stereoscope, as claimed in claim 1, including a marking tool aligned with said adjustable indicator and movable axially and transversely with respect to the optical axes of the lenses, and a recording platform to receive a chart upon which the marking tool is adapted to indicate, substantially as described.

3. A stereoscope, as claimed in claim 1, including a transversely disposed beam, a slide mounted on said beam and upon which the said adjustable indicator is carried, a platform having the said lenses mounted in an upright portion thereof, the two pictures being mounted at the opposite end thereof, the said beam being slidably mounted axially of the said platform, the latter being provided with a space to receive a chart, and a marking tool aligned with said adjustable indicator and adapted to operate on said chart, substantially as described.

4. A stereoscope, as claimed in claim 1, in which the pictures are pivoted at their central longitudinal axes and adjustable vertically with respect to each other to change their inclination, and in which the said adjustable indicator wire is carried by a supporting member capable of parallel adjustment to coincide with the said pictures, substantially as described.

5. A stereoscope, as claimed in claim 1, in which the said lenses are mounted in a pivoted block, the latter being carried by an upright provided with openings in which the said parallel indicating lines are mounted, substantially as described.

In testimony whereof I hereunto affix my signature in the presence of two witnesses.

KURT BEYERLEN.

Witnesses:
A. DE OLEA,
PAUL DRCY.